United States Patent [19]
Bolger

[11] 3,914,562
[45] Oct. 21, 1975

[54] SUPPLYING POWER TO VEHICLES

[76] Inventor: John G. Bolger, 469 Tahos Road, Orinda, Calif. 94563

[22] Filed: Sept. 10, 1974

[21] Appl. No.: 504,843

Related U.S. Application Data
[63] Substitute for Ser. No. 146,214, May 24, 1971, abandoned.

[52] U.S. Cl. ................................ 191/10; 191/4
[51] Int. Cl.² ........................................... B60J 9/00
[58] Field of Search ........... 104/148 LM; 191/4, 10; 310/12–14

[56] References Cited
UNITED STATES PATENTS

| | | | |
|---|---|---|---|
| 461,057 | 10/1891 | Shover | 191/10 |
| 1,188,570 | 9/1916 | Strobel | 191/4 |
| 3,626,858 | 12/1971 | Colling | 104/148 LM |

Primary Examiner—M. Henson Wood, Jr.
Assistant Examiner—D. W. Keen
Attorney, Agent, or Firm—Colton & Stone, Inc.

[57] ABSTRACT

There is disclosed an electrically driven vehicle having suitable batteries to drive the vehicle on conventional roads. The vehicle has means thereon for receiving power from a conductor embedded in a prepared roadway for driving the vehicle and for charging the batteries. An important feature of the invention resides in means for lowering the power receiving means to establish a small air gap with the conductor for operation on a specially prepared roadway and for raising the power receiving means to provide sufficient clearance to accommodate normal obstacles, such as driveway gutters, when the vehicle is driven on conventional roads. When driving on the prepared roadway, means are provided for automatically maintaining a desired air gap between the roadway conductor and the power receiving means.

9 Claims, 9 Drawing Figures

SUPPLYING POWER TO VEHICLES

CROSS REFERENCE TO RELATED APPLICATIONS

This application is a substitute for Application Ser. No. 146,214, filed May 24, 1971, now abandoned.

The device of this invention is particularly adapted for use on a roadway of the type disclosed in Application Ser. No. 431,924, entitled ROADWAY FOR SUPPLYING POWER TO VEHICLES, which is a continuation of Application Ser. No. 345,332 which is in turn a continuation of Application Ser. No. 146,213.

BACKGROUND OF THE INVENTION

Because of the pollution problems caused by existing internal combustion engines, there has recently been considerable effort expended toward providing pollution free, vehicular power plants. One of the alternatives suggested has been electrically driven vehicles having battery power sources. Although this approach has been used for some time for short-range special-purpose vehicles, such as golf carts and forklift trucks, conventional batteries are not well adapted for use as the primary energy source to propel general purpose vehicles. Besides lacking sufficient ampere-hour capacity for extended use, the weight of conventional batteries seriously inhibits their use as the primary source of energy for general utility vehicles.

A possible solution to the inability of present batteries to act as the source of energy for general utility vehicles has been proposed in U.S. Pat. No. 874,411. In this disclosure, an electrically powered vehicle is equipped with suitable batteries to drive the vehicle upon conventional roadways. A specially prepared roadway has one or more conductors associated therewith inductively coupled to a pickup on the vehicle for driving the vehicle on the specially prepared roadway and for charging energy storage means which typically comprise vehicle batteries but may also include other energy storage means such as a flywheel.

A serious disadvantage of the proposal in the aforementioned patent resides in the size of the air gap between the power conductor and the pickup coil. It will be appreciated by those skilled in the art that as the air gap increases, the reluctance of the magnetic circuit increases thus reducing the maximum energy which can be coupled. A related problem resides in providing sufficient clearance under the vehicle to accommodate normal under-vehicle obstacles encountered on conventional roadways. The solution of the above patent to these problems is to provide an overhead conductor for automobile type applications which necessarily require significant vehicle clearance and an embedded conductor for rail type vehicles, which do not require significant clearance therebeneath.

Overhead conductors, which are required by the disclosure of the aforementioned patent for use on automobiles and like vehicles, have serious disadvantages. It will be apparent that the appearance of both the overhead lines and the appearance of the vehicle leave much to be desired. On the other hand, the embedded conductor disclosed in the aforementioned patent is not susceptible for use on automotive type vehicles since these vehicles must necessarily leave the specially prepared roadway and encounter normal highway obstacles, for example, driveway gutters, parking ramps and the like, which cannot be accommodated by the pickup on the vehicle.

Other disclosures of interest in either propelling or controlling a vehicle from means disclosed in the roadway are shown in U.S. Pat. Nos. 663,398; 3,085,646 and 3,293,581.

SUMMARY OF THE INVENTION

It is an object of this invention to provide a system for efficiently supplying power to vehicles by means of an electrical conductor associated with the roadway and a vehicle having a pickup thereon for coupling to the conductor.

Another object of the invention is to provide a vehicle having means for receiving power from a conductor associated with a traffic surface wherein the power receiving means may be raised and lowered.

A further object of the invention is to provide an electrically driven vehicle provided with energy storage means for driving the vehicle along conventional roadways, means for receiving power from a conductor associated with a specially prepared roadway and means for raising and lowering the power receiving means to enable the vehicle to be efficiently operated in either drive mode.

In summary, this invention comprises a vehicle including a framework having a plurality of wheels thereon; an electric motor for driving at least one of the wheels; means on the vehicle for receiving power from a conductor associated with a road for supplying power to the motor during travel therealong; means for raising and lowering the power receiving means relative to the electric motor when the vehicle is off of roads equipped with a conductor; means electrically interconnecting the power receiving means, the energy storing means and the electric motor; and means operative when the vehicle is traveling on a road having a conductor associated therewith for maniupulating the raising and lowering means in response to the difference between energy received by the power receiving means and energy consumed by the vehicle.

DETAILED DESCRIPTION OF THE PREFERRED EMBODIMENTS

Figure 1:
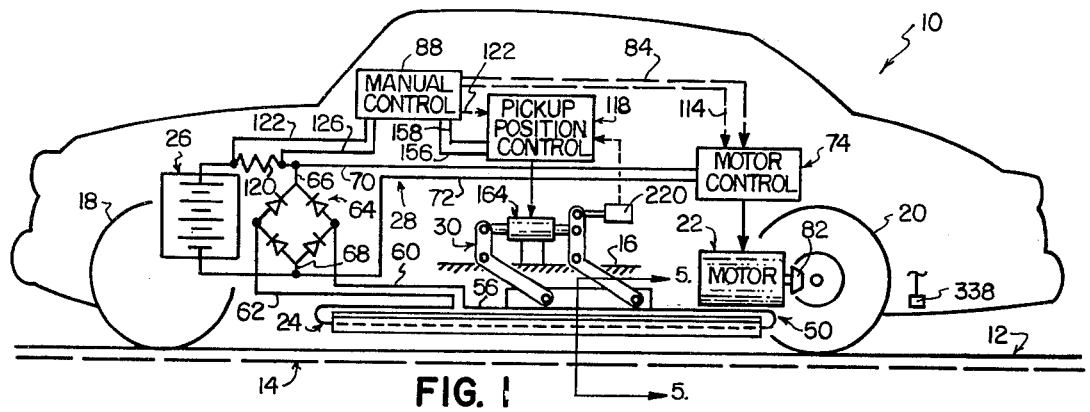
FIG. 1 is a schematic view of a vehicle equipped with the device of this invention illustrating the power receiving means in the lowered position.

Referring to FIG. 1, there is illustrated a vehicle 10 operating on a road or traffic surface 12 which has associated therewith a power source 14 for transmitting energy to the vehicle 10. The vehicle 10 comprises as major components a framework 16, a pair of steerable front wheels 18, a pair of rear wheels 20 driven by an electric motor 22, pickup means 24 for receiving power from the power source 14, a battery or energy storage means 26, means 28 operatively connecting the power receiving means 24 and the energy storage means 26 to the electric motor means 22 for driving the vehicle 10, and means 30 for raising and lowering the pickup means 24 relative to the road 12.

In operation on the road 12, the raising and lowering means 30 is manipulated to position the pickup means 24 closely adjacent the power source 14 to reduce the air gap therebetween. Energy is inductively coupled from the power source 14 to the pickup means 24 and is transmitted through the connecting means 28 to the energy storage means 26 and/or the motor 22. When traveling along the road 12, sufficient energy may be inductively coupled to the pickup means 24 to charge the energy storage means or battery 26 as well as to drive the motor 22.

Figure 2:
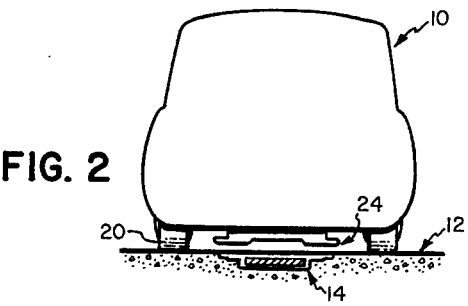
FIG. 2 is a rear view of the vehicle of FIG. 1.

There is shown in FIG. 2 a representation of the vehicle 10 driving along the road 12 and being powered by energy inductively coupled from the power source 14. It will be apparent from FIG. 2 that the air gap between the core of the power source 14 and the pickup means 24 is relatively small thereby enhancing the efficiency of the inductive coupling therebetween.

Figure 3:
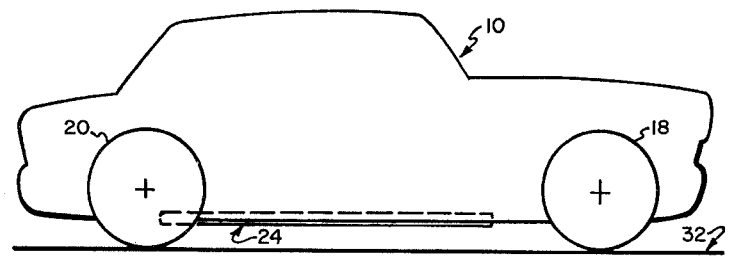
FIG. 3 is a view similar to FIG. 1 illustrating the power receiving means in the elevated position to provide substantial clearance beneath the vehicle.
Figure 4:
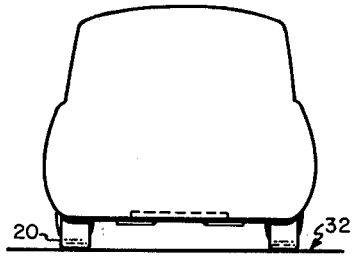
FIG. 4 is a rear view of the vehicle of FIG. 3.

As shown in FIGS. 3 and 4, the vehicle 10 is traveling along a conventional road 32 which is not equipped with a power conductor. The raising and lowering means 30 is manipulated to raise the pickup means 24 to provide clearance under the vehicle 10 sufficient to accommodate normally encountered roadway hazards, such as driveway gutters, parking ramps and the like. In this mode of operation, the vehicle 10 is driven by the motor 22 which is energized from the battery 26. It will accordingly be seen that this invention provides a vehicle which is alternatively capable of achieving a small air gap between inductively coupled elements for propelling the vehicle along a specially prepared roadway and providing substantial clearance beneath the vehicle for operation on a conventional road.

Figure 5:
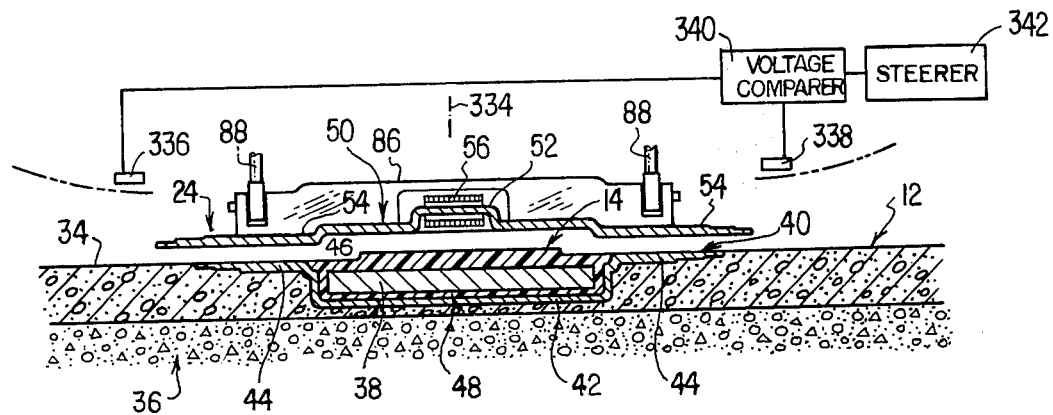
FIG. 5 is an enlarged cross-sectional view of this invention taken substantially along line 5—5 of FIG. 1 as shown in the direction indicated by the arrows.
Figure 6:
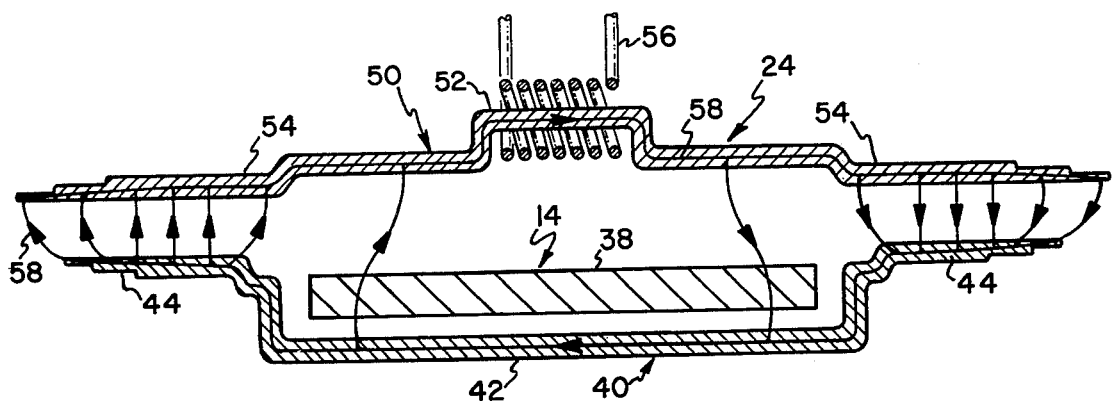
FIG. 6 is an enlarged schematic view of the magnetic components of the conductor and pickup.

The specially prepared road or traffic surface 12 is illustrated in FIGS. 5 and 6. It is contemplated that heavily traveled thoroughfares, for example, freeway networks surrounding major cities, may be modified or constructed as discussed hereafter. The typical commuter driving the vehicle 10 would operate under battery supplied power until reaching the freeway. On the freeway, the vehicle 10 would be driven by energy inductively coupled from the power source 14. Coupled energy in excess of vehicle consumption would add charge to the battery. Upon exiting from the freeway, the vehicle 10 would again be driven by battery supplied power. In this fashion, the batter 26 can be periodically charged to provide an acceptable range of travel off the specially prepared road 12.

To construct the road 12, a shim layer 34 of concrete may be applied to a preexisting road surface 36 to modify an existing freeway or may be applied in the construction of a new highway. A source conductor 38, which may be made of segmented aluminum or the like, is embedded in the shim layer 34, as by positioning the same in a recess provided by a source core 40. The source core 40 may be made of laminated transformer steel and includes a central depressed core section 42 and a pair of elevated lateral core sections 44 which serve as magnetic poles. An insulating section 46 surrounds the source conductor 38 and prevents electrical contact between the conductor 38 and the core 40. As shown best in FIG. 5, the central portion of the insulating section 46 is elevated slightly to minimize short circuiting of magnetic flux in the event an iron strip or other piece of ferro-magnetic debris comes to rest laterally across the poles 44.

The power for the source conductor 38 preferably comes from a constant current supply so that the source voltage rises and current phase changes as vehicle loading increases. Alternating current power may be supplied from high voltage transmission lines which parallel or periodically intersect the road 12. Alternating current of any desired frequency may be used although frequencies between 100–400 Hertz are presently believed most desirable.

The pickup means 24 comprises a pickup core 50 including a central elevated section 52 and a pair of lateral sections 54 disposed closer to the road 12 which serve as magnetic poles. The width of the pickup core 50 comprises a substantial part of the width of the vehicle 10 and exceeds the width of the source core 40 in order to provide a measure of lateral positional tolerance without appreciably decreasing the energy coupled between the source core 14 and the power pickup 24. The pickup core 50 comprises a steel section, the length of which is a substantial fraction of the length of the vehicle 10. A pickup coil 56 is wound about the central core section 52.

The area of the pickup means 24 is accordingly substantial which allows a low flux density magnetic field to couple significant energy to the vehicle 10. This provides several different advantages. The downward force acting on the pickup means 24 is proportional to the square of the flux density. Accordingly, the suspension of the vehicle 10 is affected only slightly by magnetic forces when traveling on the raod 12 (FIG. 2) as compared to travel on the conventional road 32 (FIG. 4). Low flux density also allows practical vehicle clearance without requiring excessive ampere-turns in the primary. This advantage is reflected in smaller conductor size and lower cost thereof. Low flux density is also advantageous since the heating effect of the magnetic field in stray steel is an approximate function of the square of the flux density.

The magnetic circuit 58 coupling the power source 14 and the pickup means 24 is illustrated in FIG. 6. The current flowing in the pickup coil 56 is determined by the net amount of coupled flux since the voltage in the secondary coil is established by the battery 26 as will be more apparent hereinafter. It will be noted that the current in the secondary coil 56 causes ampere-turns which vectorially oppose the fixed ampere-turns of the power source 14. Accordingly, the coupled energy is self limiting and can be regulated by adjusting the air gap between the source core 40 and the pickup means 24.

As used herein, the term battery encompasses any means of storing electrical energy, such as conventional lead-acid batteries, alkaline batteries, fuel cells, flywheels and the like.

Figure 7:
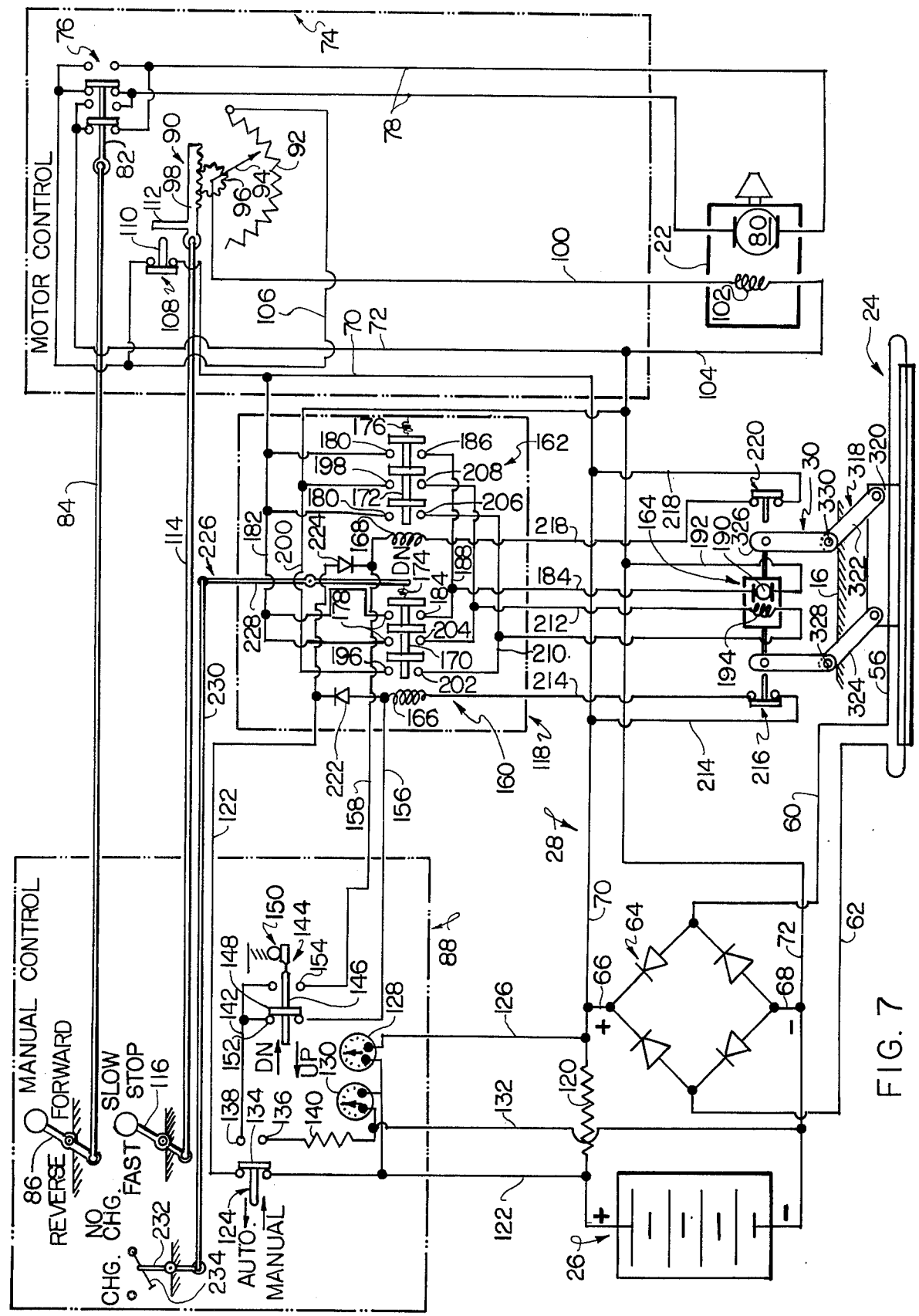
FIG. 7 is a more detailed schematic view of the electrical components of this invention.

Referring to FIGS. 1 and 7, the secondary coil 56 is connected by the means 28 to deliver electrical energy to the motor 22. The connecting means 28 includes a pair of wires 60, 62 leading to a rectifier bridge 64. The rectifier bridge 64 is connected by leads 66, 68 to a pair of wires 70, 72 respectively. The wires 70, 72 extend between the battery 26 and a motor control mechanism 74.

The motor control mechanism 74 includes a vehicle direction controller comprising a polarity reversing switch 76 having output wires 78 connected to the armature 80 of the motor 22. The switch 76 comprises a double pole-double throw switch member 82 connected by a suitable mechanical linkage 84 to a forward-reverse control mechanism or lever 86 comprising part of a manual control mechanism 88 which is conveniently positioned adjacent the driver's seat. It will suffice for present purposes to state that the motor 22 turns in one direction upon application of a given polarity to the armature 80 and reverses direction of rotation upon reversal of polarity, as will be understood by one skilled in the art.

Another major component of the motor control mechanism 74 is a vehicle speed controller comprising a rheostat 90. The rheostat 90 includes resistance element 92 and a wiper arm 94 mounted for movement in any conventional manner, as by a gear wheel 96. The gear wheel 96 meshes with a movable rack member 98 for adjusting the position of the wiper arm 94. The wiper arm 94 is connected by a wire 100 connected to one terminal of the field winding 102 of the motor 22. The other terminal of the field winding 102 is connected by a wire 104 to the wire 72. One end of the resistance element 92 is connected by a wire 106 to the wire 70 which includes therein a normally closed stop switch 108. The stop switch 108 includes an actuating member 110 thereon positioned to engage an abutment 112 carried by the rack member 98. The rack member 98 is connected by a suitable linkage 114 to a speed control mechanism or lever 116 comprising part of the manual mechanism 88 as will be more fully apparent hereinafter.

It will be apparent that manipulation of the lever 116 toward the "slow" position effects movement of the wiper arm 94 toward the wire 106 to remove the resistance element 92 from the circuit leading to the field winding 102. Manipulation of the lever 116 toward the "fast" position, as illustrated in FIG. 7, moves the wiper arm 94 to place a substantial amount of the resistance element 92 in circuit with the field winding 102 thereby increasing the speed of the motor 22 and consequently the speed of the vehicle 10. Movement of the lever 116 to the "stop" position causes the abutment 112 to engage the acutating member 110 and open the normally closed stop switch 108 thereby interrupting the circuit to both the armature 80 and the field winding 102 of the motor 22 thereby stopping the motor 22 and the vehicle 10.

The manual control mechanism 88 also provides means for controlling a pickup position control 118 for automatically or manually adjusting the position of the pickup 24 relative to the roadway 12 for varying the quantity of energy coupled between the power source 14 and the secondary coil 56. A resistance element 120 is positioned in the wire 70 between the battery 26 and the rectifier bridge 64 and constitutes part of the sensing mechanism to determine whether the battery 26 is supplying all or part of the energy for driving the motor 22 or whether the pickup 24 is wholly supplying such power.

The resistance element 120 is sized to produce a detectable voltage drop thereacross at normal operating current. For example, with a nominal operating potential of 70 volts and 50 amps, a 0.02ohm resistor will produce a voltage drop of 1 volt across the resistor 120 which is sufficient to be detected.

A lead 122 is connected to the wire 70 between the resistance element 120 and the battery 26. The lead 122 includes therein an automatic/manual switch 124 comprising part of the manual control mechanism 88 and controls an electrical path to the pickup position control 118 as will be more fully explained hereinafter. Another lead 126 is connected at one end thereof to the wire 70 between the resistance element 120 and the rectifier bridge 64 and at the other end thereof to the lead 122. An ammeter 128 is positioned in the lead 126. It will be recognized that typical ammeters comprise a resistance element on the same order of magnitude as the resistor 120. A voltmeter 130 is connected between the lead 122 and the wire 72 by a suitable connection 132.

The switch 124 may comprise a toggle type mechanism to retain the same in either the automatic position illustrated in FIG. 7 or a manual position wherein the switch element 134 engages a pair of switch terminals 136, 138. The switch terminal 136 is connected through a resistor 140 to the connection 132 and ultimately to the wire 72.

The resistor 140 is preferably sized to assure that relatively small currents pass through the switch terminals 136, 138 during the manual mode of operation. As will be more fully apparent hereinafter, the pickup position control 118 sees only the small voltage drop across the resistor 120 in the automatic mode of operation. Since the control 118 sees, in the manual mode of operation, the fully battery voltage, some means desirably limits current flow to the control 118. The terminal 138 is connected by a lead 142 to an up-down switch for manually controlling movement of the pickup 24. The switch 144 conveniently comprises a push-pull switch actuator 146 having a switch element 148 carried thereby. A detent mechanism 150 may be provided for holding the switch acutator 146 so that the switch element 148 may be positioned in neutral, out of engagement with both sets of switch terminals 152, 154. The switch terminals 152, 154 are connected respectively by leads 156, 158 to the pickup position control 118.

The pickup position control 118 comprises a pair of relays 160, 162 for energizing an electric motor 164 of the raising and lowering means 30. The relays 160, 162 respectively include a solenoid coil 166, 168 for manipulating a switch carrying element 170, 172. The switch carrying elements 170, 172 are normally biased, either by gravity or by suitable springs, 174, 176 to the normally opened position illustrated in FIG. 7. For purposes of preliminary discussion, it is assumed that the springs 174, 176 are of the same strength.

Associated with the switch carrying elements 170, 172 is a pair of switch terminals 178, 180 connected by suitable leads to a wire 182 connected to the positive wire 70. A switch terminal 184, 186 is associated with each of the relays 160, 162 and positioned to be placed in electrical communication with one of the switch terminals 178, 180 upon actuation of the respective switch elements 170, 172. The terminals 184, 186 are connected together by a lead 188 which extends to one terminal the armature 190 of the motor 164. A lead 192 places the other terminal of the armature 190 in contact with the negative wire 72. It will accordingly be seen that the armature 190 is energized with direct current of the same polarity when either of the relays 160, 162 is tripped.

It is desirable to have the capability of raising and lowering the pickup 24 in order to decrease and increase respectively the quantity of power coupled from the roadway 12. One convenient technique for achieving this function is to reverse the polarity applied to the field winding 194 of the motor 164. To this end, there is provided a switch terminal 196, 198 connected by a suitable lead 200 to the negative wire 72 and a plurality of switch terminals 202, 204, 206, 208. The terminals 202, 206 are connected to a lead 210 connected to one terminal of the field winding 194. A lead 212 connects the other terminal of the field winding 194 to the switch terminals 204, 208.

In the manual position of the switch 124, the switch 144 may be pulled outwardly to the up position illustrated in FIG. 7. It will be seen that the solenoid coil 166 is energized by completion of an electric circuit including the wire 132, the resistor 140, the switch 124, the lead 142, the switch 144, the lead 156, the coil 166, and a lead 214 which as a limit switch 216 therein for purposes more fully explained hereinafter. The coil 166 moves the switch carrying element 170 to the left as illustrated in FIG. 7 to provide electrical communication across the terminals 196, 202; 178, 204; and 178, 184. It will accordingly be seen that both the armature 190 and the field winding 194 are energized thereby driving the motor 164.

It will be seen that the circuits energizing the relays 160, 162 and the motor 164 terminate to the wire 70 on opposite sides of the resistor 120. The small voltage drop across the resistor 120 creates a small potential for delivering relatively small currents to the solenoid coils 166, 168.

In order to drive the motor 164 in the opposite direction, the up-down switch 144 is moved to the right in FIG. 7 to energize the solenoid coil 168 through an electric circuit including the lead 132, the resistor 140, the lead 142, the lead 158, the coil 168 and a lead 218 having a limit switch 220 therein as will be more fully explained hereinafter. Energization of the coil 168 effects movement of the switch carrying element 172 to the left in FIG. 7 thereby providing electrical communication across the terminals 180, 206; 198, 208; and 180, 186. It will be seen that the armature 190 is energized with direct current of the same polarity as when the relay 160 is activated. The field winding 194 is energized with direct current of opposite polarity, as will be apparent to those skilled in the art. Accordingly, the motor 164 is driven in a direction moving the pickup 24 downwardly toward the roadway 12.

It is desirable to provide an automatically functioning means for de-energizing the motor 164 during either upward or downward movement thereof. The limit switch 216 is positioned to engage some component of the raising and lowering means 30, the pickup 24 or the motor 164 to provide a limit of upward movement of the pickup 24. The limit 216 comprises a normally closed switch, which when opened, interrupts the circuit energizing the solenoid 166 thereby allowing the switch carrying element 170 to return to its normally open position. Similarly, the limit switch 220 is positioned to engage some component of the raising and lowering means 30, the pickup 24 or the motor 164 to provide a limit of downward movement of the pickup 24. The limit switch 220 likewise comprises a normally closed switch, which when opened, interrupts the circuit energizing the solenoid 168 thereby allowing the switch carrying element 172 to return to its normally open position.

In order to provide an automatic means for adjusting position of the pickup 24, the pickup position control 118 includes a pair of oppositely directed diodes 222, 224 connecting the lead 122 respectively to the solenoid coils 166, 168. Assuming for purposes of illustration that the vehicle 10 is driving along the roadway illustrated in FIG. 5, and the pickup 24 is too far from the source 14 to couple sufficient energy to sholly propel the vehicle 10, it will be apparent that some of the energy used to propel the vehicle must come from the battery 26. The relative voltages appearing in the wire 70 and the lead 122 determines which of the diodes 222, 224 will pass current. Assuming for purposes of illustration that the battery 26 is a 70 volt battery and that the rectifier bridge 14 is delivering 66 volts d.c., it will be apparent that the lead 122 is carrying a positive 70 volts whereas the wire 70 is carrying a positive voltage between 66 and 70 volts. Because the battery voltage exceeds the rectifier voltage, current flows from the battery 26 toward the motor 22. Current flow through the diode 222 is blocked since the lead 122 is more positive than the wire 70. Since the lead 122 is more positive than the wire 70, the diode 224 passes current thereby energizing the solenoid coil 168, tripping the relay 162 and energizing the motor 164 in a direction to lower the pickup 24 thereby coupling a greater amount of energy from the source 14.

As the pickup 24 gets closer to the source 14, a greater amount of energy is coupled therebetween so that the output of the rectifier bridge 64 increases. As the potential across the wires 70, 72 approaches the voltage of the battery, there is no current flow across the resistor 120 and the potential in the wire 70 approaches the battery voltage. When the voltage existing in the wire 70 is substantially equal to the voltage in the lead 122, there is no potential across the diode 224 and consequently no current flow. Thus, the solenoid coil 168 is de-energized allowing the switch carrying element 172 to return to its normally open position. Thus, downward movement of the pickup 24 toward the roadway 12 stops.

Assuming that the vehicle 10 is moving down the roadway 12 in a balanced condition wherein all propulsion energy is derived from the source 14 and then the vehicle 10 starts down a hill, there is an obvious lessening of the power requirements by the motor 22. In this situation, voltage in the wire 70 increases, for example to 74 volts positive d.c. It will accordingly be seen that there is current flow across the resistor 120 from the rectifier bridge 64 to the battery 26. The voltage appearing in the lead 122 will be the voltage developed by the battery 26. There is accordingly a potential difference applied across the diodes 222, 224. Current flow is blocked across the diode 224 since the wire 70 experiences a higher positive d.c. voltage than does the lead 122. Since the lead 122 is less positive than the wire 70, current flows through the lead 214, the solenoid coil 166 and the diode 222. Accordingly, the solenoid coil 166 is energized thereby tripping the relay 160 and energizing the motor 164 to raise the pickup 124 relative to the source 14. Accordingly, the amount of energy coupled to the pickup 24 is reduced and continues to reduce so long as the pickup 24 moves upwardly. When the voltage delivered by the rectifier bridge 64 approaches the voltage of the battery 26, there is no potential difference across the resistor 120 and consequently no potential difference between the lead 122 and the wire 70. Accordingly, the solenoid coil 166 is de-energized allowing the switch carrying element 170 in return to its normally open position illustrated in FIG. 7 thereby stopping movement of the pickup 24.

As heretofore described, the pickup position control 118 is designed to adjust the position of the pickup 24 at any time the rectifier bridge 64 is not supplying the exact amount of power required by the motor 22. It may be desirable to provide means for charging the battery 26 during travel of the vehicle 10 along the prepared road 12. In this situation, it is desirable that the pickup position control 118 not move the pickup 24 until the rectifier bridge 64 is delivering all of the power required to drive the motor 22 as well as a certain amount of battery charging current. One simple mechanical technique for achieving this end resides in the design of the springs 174, 176 in the relays in the relays 160, 162. In order to shift the switch carrying element 170 to the left in FIG. 7, the coil 166 must develop sufficient magnetic forces to counteract the spring 174. Similarly, the coil 168 must develop sufficient magnetic forces to attract the switch carrying element 172 against the bias of the spring 176.

By designing the spring 176 to be relatively weak, the coil 168 will quickly trip the relay 162 to increase power coupled to the rectifier bridge 64 and will open when a very small potential difference exists across the wires 70, 122. By designing the spring 174 to be relatively stronger, the coil 166 will not trip the relay 160 to decrease power coupled to the rectifier bridge 64 and will not open until a larger potential difference exists across the wires 70, 122. The result is that the battery 26 will tend to be charged at all times that the vehicle 10 is driving on the prepared road 12.

In the alternative, there may be provided a conventional mechanism 226 for mechanically increasing the output of the spring 174 and thereby temporarily creating an imbalance between the relays 160, 162 to provide a battery charging current at the direction of the driver. To this end, the mechanism 226 may comprise a lever 228 pivoted intermediate the ends thereof and connected at one end to the spring 174 for providing the reaction support therefor. The lever 228 may be connected through a suitable linkage 230 to a control mechanism 232 provided with a detent 234 for holding the mechanism 226 in either the "charge" or "no charge" condition.

Figure 8:
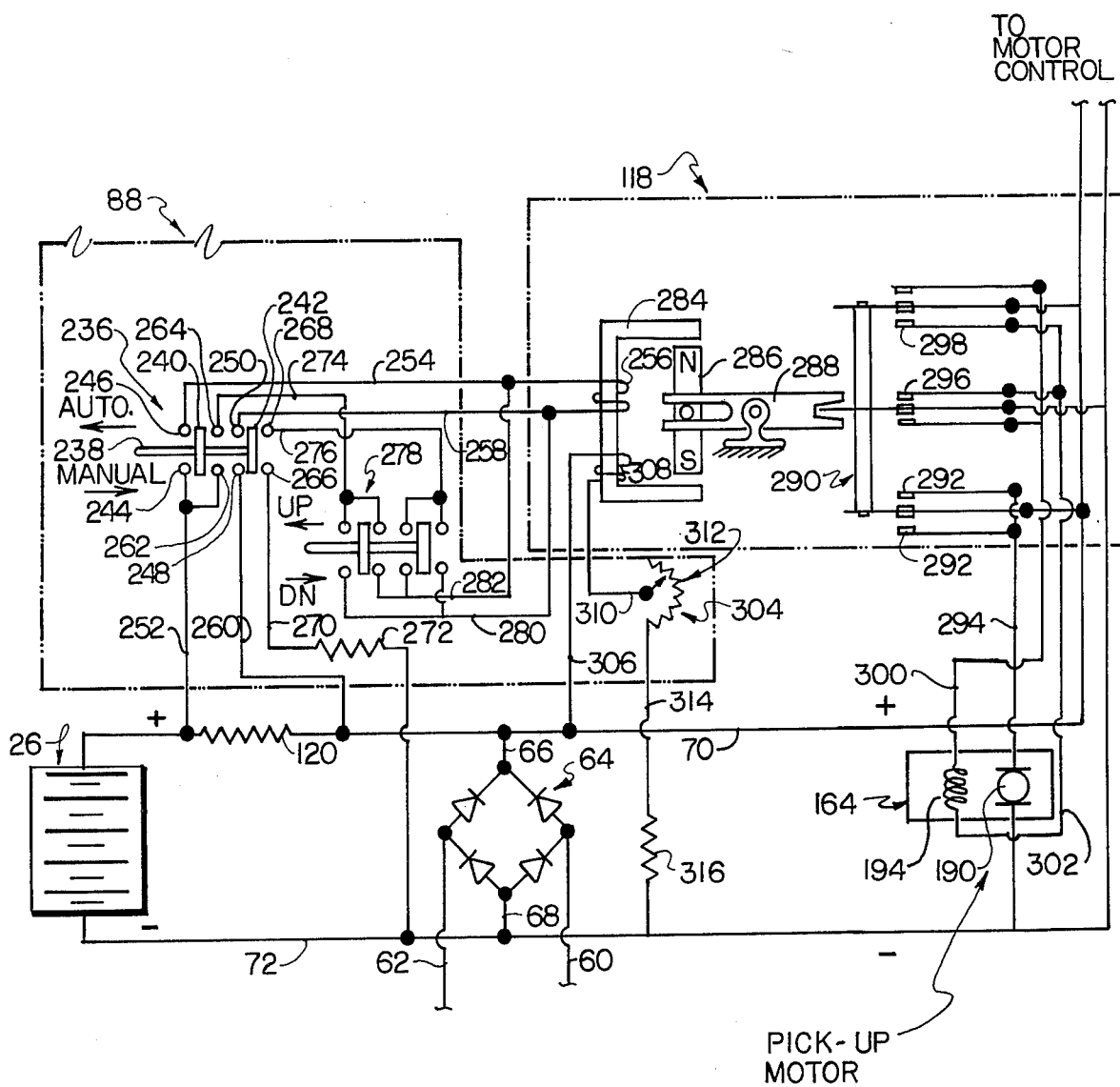
FIG. 8 is an enlarged broken view of part of FIG. 1.

Referring to FIG. 8, there is illustrated an electrical technique to provide for charging of the battery during travel on the roadway in the discretion of the driver. The illustration of FIG. 8 is an abbreviation of the more complete description of FIG. 7 in which the motor control 74, the drive motor 22, the pickup 24, the raising and lowering means 30 and part of the manual control 88 have been omitted. Identical reference characters have been used in the illustration of FIG. 8 for purposes of brevity.

In the embodiment of FIG. 8, the motor control 88 comprises an automatic-manual switch 236 illustrated in the automatic operating position. The switch 236 comprises an actuator 238 carrying a pair of switching elements 240, 242. A first group of switch terminals 244, 246, 248, 250 are closed in the automatic position of the switch 236. A lead 252 is connected to the wire 70 between the resistor 120 and the battery 26 and to the terminal 244. A wire 254 connects the terminal 246 to a magnetic coil 256 which is connected by a wire 258 to the terminal 250. A lead 260 connects the terminal 248 to the wire 70 at a location between the resistor 120 and the rectifier bridge 64.

The swtich 236 comprises a second group of terminals 262, 264, 266, 268 for engaging the switch elements 240, 242 in the manual position of the switch 236. The terminal 262 is connected to the lead 252 and the terminal 266 is connected by a wire 270 having a resistor 272 therein to the negative wire 272. The terminals 264, 268 are connected by suitable leads 274, 276 to an up-down switch 278 which acts as a polarity reversing switch connected by a pair of leads 280, 282 to the coil 256.

The pickup position control 118 comprises a magnetic yoke 284 having a permanent magnetic armature 286 therein which is attracted to opposite sides of the yoke 284 in response to the direction of current flow through the coil 256. The armature 286 is operatively connected to a lever actuator 288 which is positioned to move a switch actuator 290 in opposite directions from a neutral position illustrated in FIG. 8. It will be apparent that one set of switch terminals 292 is connected by a lead 294 to the armature 190 of the motor 164. It will also be apparent that two pairs of switch terminals 296, 298 are connected to the field winding 194 by suitable leads 300, 302 for reversing the polarity applied to the field winding 194 in response to the position of the switch actuator 290.

As heretofore described, the operation of the embodiment of FIG. 8 is not substantially different than the operation of the embodiment of FIG. 7. With the switch 236 in the manual position, an up-down switch 278 may be moved to the left to energize the coil 256 in a direction to close the terminals 296, 298 and apply a polarity to the motor winding 194 to raise the pickup. The switch 278 may be moved to the right to reverse the direction of current flow through the coil 256 and consequently change the direction of movement of the armature 286 and consequently reverse the polarity applied to the winding 194 in order to drive the motor 164 in the opposite direction.

With the switch 236 in the automatic position, and the battery 26 contributing significantly to motive power, the potential seen by the lead 252 is more positive than the potential seen by the lead 260. Consequently, current flows through the lead 252, the wire 254, the coil 256 and the lead 260 to move the armature 286 in a direction to close the terminals 296, 298 in order to drive the motor 164 in a direction to lower the pickup. On the other hand, if the pickup is too close to the roadway 12 and the rectifier bridge 64 is delivering too much energy, the potential seen by the wire 260 is greater than that seen by the lead 252. Consequently, there is current flow through the wire 260, the wire 258, the coil 256, the wire 254 and the lead 252 thereby energizing the coil 256 in the opposite direction. The armature 286 is accordingly moved in a direction to close the switch terminals 106, 298 in a direction to drive the motor 164 in a raising direction.

An important feature of the embodiment of FIG. 8 resides in a charge rate adjusting mechanism 304. The mechanism 304 comprises a lead 306 connecting the positive wire 70 to a secondary or trim coil winding 308 which is connected by a lead 310 to a rheostat 312. The rheostat 312 is connected by a wire 314 having a resistor 316 therein to the negative wire 72. The rheostat 312 and the resistor 316 are sized so that very little current flow passes through the coil winding 308 when all of the rheostat resistance is in the circuit. As the rheostat arm is moved by the operator to remove part of the resistance thereof from the circuit, sufficient current flows through the coil 308 to at least assist in tripping the armature 286. When the rheostat resistance is out of the circuit, current flow through the coil 308 is conveniently sufficient to trip the armature 286 and drive the motor 164 in a lowering direction.

It will be noted that current flow through the winding 308 is in one direction only, which direction corresponds to movement of the armature 286 in a direction to drive the motor 164 in a lowering direction. In a sense, the charger rate adjusting mechanism 304 acts as a bias on the armature 286. Thus, when the motor 164 is raising the pickup 24, the bias of the mechanism 304 counteracts the coil 256 somewhat to stop movement of the pickup 24 at a location where the bridge 64 is delivering more power than consumed by the motor 22. Similarly, when the motor 164 is lowering the pickup 24, the bias of the coil 308 adds to the bias of the coil 256 to move the pickup 24 closer to the roadway 12 than required to balance power consumption and power received from the pickup 24.

The clearance between the source core 40 and the pickup 24 should be as close as practicable when maximum energy transfer is desired in order to minimize the reluctance of the magnetic circuit, while not so close as to contact the road because of normal undulations and the like. In this regard, it should be noted that the pickup 24 is disposed between the front and rear wheels 18, 20. This location on a vehicle is the least susceptible to random vertical movements caused by variations in the road 12. The air gap between the source core 40 and the pickup 24 may be selected in accordance with known engineering principles. A reasonable selection for the air gap is in the range of ¾-2 inch, depending on the number of ampere-turns in the power source 14 and other design variables as known in the art.

As shown in FIGS. 1 and 7, the raising and lowering means 30 may be of any suitable design to accomplish up and down movement of the pickup 24 while maintaining the same generally parallel to the power source 14. The raising and lowering means 30 conveniently includes a linkage 318 connecting the framework 16 to suitable bracing elements 320 secured to the pickup core 50 as shown in FIGS. 1, 5 and 7. Two sets of bell crank arms 322, 324 are connected to the bracing elements 320 and to a double ended reciprocating output member 326 provided by the motor 164. The arms 322, 324 are mounted by pivot pins 328, 330 to the vehicle framework 16.

Figure 9:
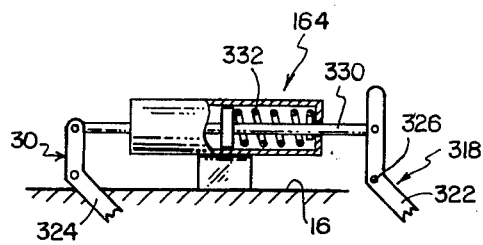
FIG. 9 is a side elevation view of another type vehicle equipped with this invention.

As shown in FIG. 9, the motor 164 conveniently includes means 322 for storing energy therein during downward travel of the pickup 24. The storage means 332 may comprise a compression spring as illustrated in FIG. 9 or a compressed air chamber. The provision of the energy storage means 322 provides high upward acceleration of the pickup 24. This feature is particularly desirable when used in conjunction with sensors (not shown) to detect an approaching roadway obstruction. The energy storage means 332 provides for rapid upward movement of the pickup 24 without requiring a high power rating for the motor 164.

It will be apparent to those skilled in the art that the vehicle 10 is particularly adapted to be controlled by electrical signals imposed on the power source 14. Vehicle velocity may be controlled by superimposing a variable frequency signal on the lower frequency of the current in the power source 14. The vehicle 10 may be provided with means for sensing the signal frequency to control the vehicle velocity. Proximity to other vehicles may be monitored by optical, radar or ultrasonic techniques to override the velocity control to maintain a safe vehicle spacing and to actuate the brakes of the vehicle 10 in the event of an emergency. By using vehicle sensors in the road 12 or deriving vehicular load data from the input power circuit, computerized controls may be used to regulate the flow of traffic through on-ramps and adjust highway speeds before and after the on-ramps to accomodate a maximum amount of traffic with a minimum amount of driver concern.

It is desirable to provide some means for automatically maintaining the vehicle in its lane of travel. As suggested in FIG. 5, it is anticipated that the power source 14 will be disposed along the centerline of the traffic lane in the road 12. Under this condition, the vehicle 10 may be maintained in its lane of travel by roughly centering the centerline 334 of the vehicle 10 with respect to the power source 14. This may be readily accomplished by providing a pair of inductive pickups 336, 338 on the vehicle 10 equidistant from the centerline 334. As the inductive pickup 336, for example, moves closer to the centerline of the power source 14, the voltlage therein increases while the voltage in the pickup 338 declines. This voltage difference may be interpreted by a suitable voltage comparer 340 which may in turn be operatively connected to control a power steering mechanism 342 to steer the front wheels 18. As shown in FIG. 1, the inductive pickups 336, 338 are spaced, along the line of travel, from the pickup 24 and basically detect the magnetic field of power source 14 when it is undisturbed by the pickup 24. The pickup 336, 338 may perhaps be more conveniently located at the front of the vehicle.

Figure 10:
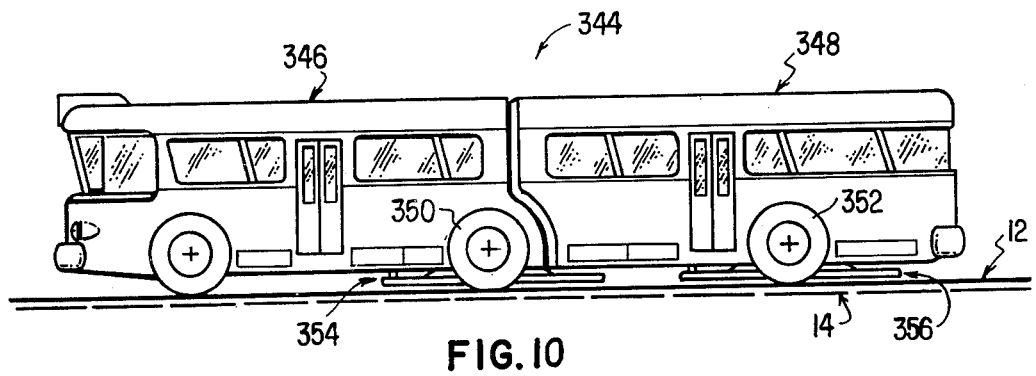

Referring to FIG. 10, a much larger vehicle 344 is illustrated as being equipped with this invention. The vehicle 344 is illustrated as a bus having front and rear sections 346, 348 having driving wheels 350, 352 respectively. The wheels 350, 352 are separately driven through suitable motors (not shown) energized during travel along the road 12 by separate pickups 354, 356. Since the vehicle 344 requires that a greater amount of energy be coupled thereto, the combined areas of the pickups 354, 356 are substantial.

It will accordingly be seen that there is herein provided an improved arrangement for supplying power to vehicles having many advantages over that afforded by the prior art.

I claim:

1. A vehicle for use on a prepared road having associated therewith a power source creating a magnetic field, the vehicle comprising a framework having a plurality of road engaging elements thereon;

an electric motor for driving at least one of the elements;

means on the vehicle for receiving power from the magnetic field in quantities proportional to the distance between the power source and the power receiving means to supply received power during travel along the road;

means for moving the power receiving means toward and away from the power source;

a source of current for supplying power to the electric motor when the vehicle is off of roads equipped with the power source;

means electrically connecting the received power supplying means, the current source and the electric motor; and means operative when the vehicle is traveling along the road having the power source thereat for manipulating the moving means in response to the difference between energy delivered by the received power supply means and energy consumed by the vehicle.

2. The vehicle of claim 1 wherein the power receiving means comprises a secondary coil for developing alternating current from the magnetic field;

the interconnecting means includes a rectifier in circuit with the received power supplying means and the current source for delivering electrical energy to the electric motor; and the manipulating means includes means responsive to the existance of predetermined current flow between the received power supplying means and the current source for actuating the moving means.

3. The vehicle of claim 2 wherein the electric motor is a direct current motor;

the current source is a rechargable source of direct current; and the rectifier is in series relation with the power receiving means and in parallel relation with the rechargable source.

4. the vehicle of claim 3 wherein the actuating means includes means for determining the existence of the predetermined current including a transducer between the rectifier and the source.

5. the vehicle of claim 4 wherein the actuating means comprises a second motor and means operatively connecting the second motor to the moving means;

a switch in circuit with the second motor; and means responsive to current flow from the rectifier to the rechargable source for actuating the switch and driving the second motor in a direction moving the power receiving means toward the power source.

6. the vehicle of claim 5 wherein the actuating means comprises a second switch in circuit with the second motor for driving the second motor in a direction moving the power receiving means away from the source; and means responsive to current flow from the rechargable source for actuating the second switch.

7. The vehicle of claim 6 wherein the transducer is a resistor and the current flow responsive means includes means responsive to a voltage drop across the resistor.

8. The vehicle of claim 4 wherein the transducer is a resistor.

9. A vehicle for use on a prepared road having associated therewith a power source creating a magnetic field, the vehicle comprising a framework having a plurality of road-engaging elements thereon;

an electric motor for driving at least one of the elements;

means on the vehicle for receiving power from the magnetic field in quantities proportional to the distance between the power source and the power receiving means to supply received power during travel along the road;

means for moving the power receiving means toward and away from the power source;

a source of current for supplying power to the electric motor when the vehicle is off roads equipped with the power source;

means electrically connecting the received power supplying means, the current source and the electric motor;

means operative when the vehicle is traveling along the road having the power source thereat for sensing and indicating the difference between energy delivered by the received power supplying means and energy consumed by the vehicle; and manual control means for energizing the moving means.

* * * * *